Patented May 20, 1930

1,759,489

UNITED STATES PATENT OFFICE

ALONZO S. McDANIEL, OF NEW YORK, N. Y., ASSIGNOR TO CELLULOSE UTILITIES CORPORATION, A CORPORATION OF DELAWARE

PRODUCTION OF CELLULOSE ESTER COMPOUNDS

No Drawing.    Application filed June 4, 1923. Serial No. 643,425.

This invention relates to cellulose ester compositions and has among its principal objects the provision of a method of dissolving cellulose esters which requires a minimum quantity of solvents.

The improved method of the present invention is applicable to the production of a wide variety of products such as artificial leather, coated fabrics, smokeless powder, celluloid films, artificial silk, lacquers and the like.

Hitherto in dissolving or plasticizing or softening a cellulose ester such as cellulose nitrate or cellulose acetate it has been necessary, in order to obtain a product of any desired fluidity or viscosity, to employ relatively large amounts of organic solvents (liquid or solid) thinners and the like and this circumstance has added greatly to the cost of manufacture of the various products derived from cellulose esters. Various attempts have been made hitherto to reduce the quantity or proportion of total solvents, softeners or thinners required for these purposes, but hitherto these methods have proved unsatisfactory in practice. Many of these proposed methods involve complicated and expensive treatments of the cellulose ester either during the esterification process or subsequent thereto or else they have involved the use of solvents or solvent mixtures which impart undesirable properties to the solution or to the products obtained therefrom by removal of the solvents. Thus, for example, it has been proposed to reduce the proportion of solvents required for making a solution having a given viscosity by first subjecting the cellulose ester to the action of acid at an elevated temperature either during the esterification process or subsequent thereto and prior to the actual solution of the cellulose ester. Such methods, however, besides being complicated and requiring special apparatus such as special autoclaves and the like for carrying them out in a satisfactory manner have the still greater disadvantage of producing products of poorer quality than are produced by the ordinary procedure now in current use. That is to say, the products produced from solutions prepared in this manner by removal of the solvents (such as films, threads, coatings and the like) frequently possess less mechanical strength, flexibility, stability and other desirable qualities than are obtained by the standard procedures which do not involve such treatment of the cellulose esters prior to their solution in the solvent.

Other suggestions for accomplishing these same desirable ends include the use of special so-called latent solvents, softeners, or solid solvents, complex mixtures of liquid solvents or of liquid and solid solvents and the like, but these methods are open to the objection that they frequently effect the solution in such way that when the volatile solvents, thinners, etc., are removed for the production of films, coatings, threads and the like, the products thus obtained are frequently non-homogeneous or cloudy or else do not possess the desired physical properties such as high tensile strength, flexibility, stability, clear color, transparency, etc.

The method of the present invention, although involving the use of a minimum quantity or proportion of solvents, thinners, softeners, etc., is, nevertheless, entirely or largely free from the foregoing disadvantages. Furthermore, my improved method may be carried out with the solvents and solvent mixtures which experience has demonstrated to be the best without substantial change in this respect and also without any radical change in the apparatus or equipment which has been found to be most suitable in the practice of the various branches of this art. In other words, the methods, processes, and equipment now in common use in the various branches of this industry may be employed substantially without change in the practice of my invention, the main difference being that a substantially less proportion of solvents is required and for this reason the cost of manufacture is greatly reduced.

The present invention consists in one of its forms of subjecting a cellulose ester such as cellulose nitrate or cellulose acetate or the like to the action of a highly or readily volatile organic, basic compound which is soluble in the solvents and solvent mixtures, commonly employed in the preparation of cellulose ester solutions, and subsequently removing the base by volatilization or neutralization or both. The readily volatile organic base preferred for this purpose is methylamine, but I may also employ any similar volatile organic base having similar properties. Thus, I may use dimethylamine, trimethylamine or monoethylamine. These organic bases all have pronounced basic properties and at the same time are soluble in the solvent and are highly volatile and form products which are insoluble in the cellulose ester solution when neutralized by an acid which is soluble in this solution and these are the main characteristics which a thinning agent must have for the carrying out of my improved process in its preferred form. By the terms volatile or readily volatile base or substituted ammonia compound or amino compound as used herein and in the claims, I mean a compound of this general character which has a boiling point substantially higher than the temperature at which nitro cellulose begins to decompose at an objectionable high rate and I have found that this temperature lies between the boiling points of monoethylamine and diethylamine.

In the practice of my invention I first select a high viscosity cellulose ester such as a high viscosity cellulose nitrate (i. e. one which gives a relatively high viscosity when dissolved in a suitable solvent) and in the latter case preferably what is known as a higher nitrate, and I subject this product to the action of a minimum amount or proportion of solvent or solvent mixture such as a mixture of ethyl acetate, methyl alcohol, acetone and methylamine, whereby the nitrated cotton dissolves in or is gelatinized by the solvent mixture. In those instances where it is desirable to use very small amounts of solvent (or plasticizing agent) I prefer to subject the cellulose ester and the solvent to a kneading or mixing operation during this step of the process. This procedure greatly accelerates or promotes the uniform dissolving or gelatinizing action of the solvents. The mixing may be carried out in any suitable type of heavy-collodion or celluloid mixer and the speed or intensity of the mixing is regulated in such manner as not to cause the temperature of the mix to rise above that point at which the product tends to decompose too rapidly. Prior to adding the neutral liquid solvents or solvent mixture to the cellulose ester I add to the neutral mixture or to one of the constituents thereof a suitable quantity of methylamine base. The effect of the free methylamine base is to promote the solution of the cellulose ester or in other words its effect is to bring about a thinning or lowering of the viscosity of the cellulose ester solution without at the same time seriously deteriorating the product. That is to say, the products obtained by removal of the volatile solvent (or upon hardening) is not adversely affected.

After the solution or mixture of solvent and cellulose ester has attained the desired consistency or viscosity in the mixer it is ready for use in connection with the coating of fabrics, the production of films, threads, and the like, or in the manufacture of lacquers and enamels, all in accordance with methods well-known to those skilled in the art. I prefer, however, to use the cellulose ester solution immediately or shortly after it has reached the desired fluidity or viscosity for the reason that when this procedure is followed the methylamine is immediately evaporated from the mixture and, therefore, is not likely to discolor or bring about other objectionable changes in the same. This discoloring is, however, very slight when methylamine is employed, even when the solution is allowed to stand or is stored for a considerable period of time. Such discoloration is somewhat more pronounced, however, with certain of the other volatile organic bases already mentioned and when these are used the cellulose ester solution should not be kept too long before using.

In some instances, the presence of even minute quantities of volatile organic amines may bring about undesirable effects in the finished products when used for certain purposes, as for example, when the solution is used for the manufacture of photographic film due to the effect upon the sensitive emulsion, and in such instances I prefer to subject the finished product before coating with emulsion to a process which will more completely remove the volatile organic base or thinning agent. Thus I may subject the solid product (film, thread, etc.) to thorough aeration preferably in a moving current of air or other suitable gas so as to carry away the fumes of the volatile organic base, or in place of the aeration treatment I may subject the finished film, thread or coating to the action of a suitable acid either by immersing the material in a dilute aqueous solution of the acid or by subjecting it (in an enclosure or housing) to the action of the fumes or vapors of a volatile acid carried in a suitable gaseous medium as for example to gaseous hydrochloric acid carried by ordinary air. Or the last traces of base may be removed in other ways to be described further on.

It will be understood that my improved invention is not restricted to the details of the methods and procedures as described above, but that I may make various changes therein without departing from the scope of my invention as already outlined and as set forth in the appended claims.

Thus, for example, instead of dissolving the volatile organic amine in the neutral solvent prior to subjecting the cellulose ester to the action thereof, I may first expose the dry or fibrous cellulose ester to the action of the vapors of the volatile organic base and then subsequently dissolve the cellulose ester in the organic solvent or mixture of solvents.

Furthermore, when it is desirable to eliminate the last traces of the free base, the latter object may be accomplished by neutralizing the organic base in the cellulose ester solution and removing the salt thus formed (as by filtration) prior to removing the solvents. This may be done by adding to the solution the required amount of a dry or anhydrous acid which is soluble in the cellulose ester solution such as hydrochloric acid dissolved in a small volume of the solvent or of a thinner (e. g. a solution of anhydrous hydrochloric acid in benzene). Other methods of neutralizing the volatile organic base while still in solution in the solvents may be employed such as the mere exposure of the solution to the action of the fumes of a suitable volatile acid (soluble in the cellulose ester solution) such as hydrochloric acid or acetic acid preferably with stirring, until the solution is exactly neutralized or slightly acid. If excess of acid is used it may be volatilized or neutralized with any suitable antacid such as urea, etc. The preferred method for removing the organic base, however, is by complete evaporation as above described without resorting to neutralization.

In preparing cellulose ester solutions from cellulose esters and a solvent in accordance with my invention, the usual procedures known to the art may be used, except for the use of the volatile organic base and the consequent changes in procedure already described. In the use of a volatile organic base in accordance with my invention, I have found certain proportions and other conditions of application to be particularly suitable.

As to the proportion of volatile organic base, it will be understood that I may vary the quantity used according to the results desired, but as an example, I have found that suitable results are obtained by the addition of monomethylamine in an amount corresponding to about $\frac{1}{10}$ of 1% of the dry weight of cellulose ester in preparing solutions containing from about 20 to 40 oz. of cellulose ester per gallon of total solvents. The reduction in viscosity produced by the addition of this amount of the volatile organic base will vary somewhat with the temperature, time and conditions of mixing, but ordinarily will correspond to a final viscosity of from about $\frac{1}{2}$ to $\frac{1}{10}$ of the viscosity which the solution would otherwise have had without the addition of the volatile organic base or similar thinning agent. Notwithstanding this very radical reduction in the viscosity of the solution the desirable properties of the latter are not seriously deteriorated or in other words, the final products produced by removal of the solvents (films, threads, coatings and the like) or by hardening (as in plastic products) have substantially the same mechanical strength, stability and other desirable qualities as similar products prepared according to the usual standard methods now in common use.

The amount or proportion of volatile organic base required is generally less for the heavier or more viscous products than for the more fluid ones. That is to say, the percentage reduction of viscosity produced with a given per cent of base is greater with more viscous products than with less viscous ones when the percentage of base is expressed in terms of a percentage of the dry weight of the cellulose ester.

It will be understood that the term "dissolving" as used in the claims appended hereto includes the process of converting the pure solid cellulose ester into a more fluid product by means of reagents whether the resulting more fluid product be actually a liquid or a viscous syrup or a plastic semi-solid mass.

The extent and speed of reduction of the viscosity of the cellulose ester solution produced by the action of the volatile amino base, in many instances, may be regulated to a considerable extent by adjusting the conditions under which my improved process of dissolving cellulose ester is carried out. Thus, the action of a given proportion of the amino base is increased by increasing the temperature. This may be accomplished without objectionable volatilization of the amino base or solvents before the action of the former is completed by carrying out the operation with moderate heating under pressure in a closed vessel. So also the effect of the amino base is increased within limits by employing a solvent or solvent mixture which carries an amount of moisture dissolved therein which is greater than that normally carried by the solvent or when the latter is specially dried. When a relatively moist solvent or solvent mixture is used, it is frequently advisable to adjust the composition of the solvent mixture in such way as to prevent the moisture from causing cloudiness or other objectionable effects in the product upon evaporation. The methods of making such adjustments are well-known in the art, one method being to employ a relatively small amount of fusel oil or equivalent non-hygroscopic high boiling solvent in connection with a solvent mixture containing, for example, amyl acetate, wood alcohol and camphor.

The action of the amino base may be further regulated as previously indicated by regulation of the stirring and also, of course, by adjusting the proportion which is employed.

It will be understood that one of the most important features of my invention is the complete removal of the basic reagent used for thinning the cellulose ester solution or reducing the viscosity thereof and while this removal of the basic reagent in the preferred form of my invention is brought about by volatilization or by volatilization and neutralization, I may, nevertheless, remove or eliminate the base in other ways. Thus, I may remove the base by neutralizing and then adding a solvent mixture (after the desired digesting action has been completed) in which the salt so formed is substantially insoluble and then separate the salt by filtration, decantation, or centrifugal treatment or by any other convenient method adapted for separating a suspended solid from a viscous liquid. As an example of the foregoing method of eliminating the basic reagent when a volatile methyl or ethyl amine basic reagent is used, I may first dissolve the base in methyl alcohol and then employ this alcoholic solution as one of the constituents of the mixed solvent used for dissolving the cellulose ester. Any suitable formula or solvent mixture which includes methyl alcohol may be used in this instance, but in order to eventually bring about the complete removal of the base, etc. (or the salts produced therefrom by neutralization) I employ a maximum amount of the alcohol solution which is consistent with the particular solvent formula employed. That is to say, I merely increase the proportion of methyl alcohol in one of the usual solvent formula well-known in the art. The purpose of this increase in proportion of methyl alcohol or equivalent liquid is in part to make it possible to incorporate a larger proportion of moisture in the solvent mixture than otherwise would be possible. This increased amount of proportion of water promotes the thinning or digesting action of the basic reagent upon the cellulose ester enabling the thinning or reduction in viscosity to be brought about in a minimum volume of solvent mixture containing a maximum proportion of moisture which is compatible with the entire mixture. Or I may use relatively large proportions of acetone in the manner just described in connection with the use of larger proportions of methyl alcohol.

After the desired digestion or thinning has been attained in this way, with the aid of thorough stirring if necessary, I next neutralize the base by means of a solution of an anhydrous volatile acid such as hydrochloric acid or acetic acid dissolved in a small amount of the solvent mixture or in one of the strongly hygroscopic constituents thereof as methyl alcohol or acetone. An excess of acid is avoided, but a slight excess is not objectionable.

After the basic reagent has been neutralized in this manner I next add to the solution (usually viscous or gelatinous), an additional amount of the same solvent mixture employed during the digestion of the cellulose ester, except that the methyl alcohol or acetone or other moisture-bearing or strongly hygroscopic constituent is kept at a minimum in this second portion of the solvent mixture to reduce the proportion of moisture in the total solution to a minimum or to a value corresponding to a minimum solubility of salt.

The proportions of the constituents of the solvent mixture in the final solution should correspond to some standard solvent formulæ such as those mentioned above and which are well-known in the art and should contain an amount of moisture corresponding to minimum solubility of the salt formed by neutralization. After removing the salt more moisture may be added if desired to obtain the optimum fluidity.

The second portion of the solvent mixture added after the digesting operation and subsequent neutralization should contain as little moisture as practicable, the drier the better. In this manner the moisture present during the first or digesting step of the operation is kept at a maximum to promote the action of the basic digesting or thinning reagent. During the second step of the process (after neutralization) the moisture content is reduced to a minimum to precipitate the salt as completely as possible from the cellulose ester solution.

The final effect of the foregoing procedure is to completely precipitate the salt or neutralized base from the cellulose ester solution. The precipitated salt may then be removed from the solution by filtering, centrifuging or in any other convenient manner leaving the cellulose ester solution entirely free from the reagent employed for thinning the same or from any salts or other products resulting from its use.

I have found that if any considerable proportion of a volatile strong base or salt thereof is allowed to remain in the cellulose ester solution, the final products produced therefrom by removal of solvent, such as films, threads, coatings and the like, will frequently become deteriorated by the action of these products, which sometimes cause brittleness or "sweating" or other objectionable effects.

In the foregoing example instead of a volatile amino base I may use any other basic reagent of like strength which is appreciably soluble in a relatively moist cellulose ester solution but which itself, or the salt of which, is substantially insoluble in a dry or anhydrous cellulose ester solution. Thus, for example, I may use sodium hydroxide, sodium carbonate or the carbonate of potassium or the bicarbonate of sodium or the bicarbonate of potassium or the acid carbonate of calcium and like carbonates, but of these non-volatile bases I prefer the carbonate of an alkali metal such as sodium or potassium because of their more pronounced basic properties. When carbonates are used I prefer to omit the neutralization step to avoid gas bubbles due to carbon dioxide, the carbonates themselves being entirely insoluble in the cellulose ester solution when the moisture content thereof is reduced to a minimum.

When the digestion step and subsequent removal or elimination of the basic reagent in accordance with my invention is accomplished by means of a non-volatile basic reagent the amount or proportion of the latter which I prefer to use in digesting will vary according to its basic strength and other conditions as hereinbefore mentioned in connection with the use of a volatile amino compound but in the case of sodium carbonate and the like I prefer to employ an amount corresponding to about the chemical equivalent of the amount of methylamine hereinbefore specified. For weaker bases than sodium carbonate I prefer to use more and for stronger bases less than this amount.

It will be understood that the term "uncombined" as employed in the appended claims with reference to the base specified in the claims means the free base as distinguished from the base in combination with an acid to form a salt of the base with the acid. Thus for example it will be understood that if the cellulose ester contains acid, as for example sulphuric acid, then in order to bring the cellulose ester itself into intimate contact with uncombined base, such as monomethylamine, the base must be present in sufficient amount to completely neutralize the acid, sulphuric acid, and leave an excess of the base, monomethylamine, in intimate contact with the cellulose ester over and above that required to completely neutralize the acid.

I claim:

1. In the method of dissolving a cellulose ester, the step which comprises bringing the cellulose ester into intimate contact with uncombined, readily volatile substituted ammonia base.

2. In the method of dissolving a cellulose ester, the step which comprises bringing the cellulose ester into intimate contact with uncombined readily volatile alkyl amine base.

3. In the method of dissolving a cellulose ester, the step which comprises bringing the cellulose ester into intimate contact with uncombined monomethylamine base.

4. In the method of disolving a cellulose ester, the step which comprises bringing the cellulose ester into intimate contact with uncombined monomethylamine base, and subsequently removing the monomethylamine from the ester.

5. In the method of dissolving a cellulose ester, the step which comprises bringing the cellulose ester into intimate contact with uncombined monomethylamine in an amount corresponding to between about $\frac{1}{10}$ of one per cent and about five per cent of the dry weight of the cellulose ester compound.

6. In the method of dissolving a cellulose ester the step which comprises bringing the cellulose ester into intimate contact with an uncombined volatile amino base derivative and subsequently neutralizing the amino derivative by means of an acid.

7. In the method of dissolving a cellulose ester, the step which comprises bringing the cellulose ester into intimate contact with an uncombined volatile amino base derivative and subsequently neutralizing the amino derivative by means of a volatile acid which is soluble in the cellulose ester solution.

8. In the method of dissolving a cellulose ester, the step which comprises bringing the cellulose ester into intimate contact with an uncombined volatile amino base derivative and subsequently neutralizing the amino derivative by means of hydrochloric acid.

9. In the method of dissolving a cellulose ester, the step which comprises bringing the cellulose ester into intimate contact with an uncombined volatile amino base derivative and subsequently neutralizing the amino derivative by means of an excess of hydrochloric acid, and then volatilizing the excess hydrochloric acid.

10. In the mehod of dissolving a cellulose ester, the step which comprises bringing the cellulose ester into intimate contact with the vapors of uncombined monomethylamine base.

11. In the method of dissolving a cellulose ester, the step which comprises bringing the cellulose ester into intimate contact with the vapors of a volatile uncombined amino base.

12. In the method of dissolving a cellulose ester, the step which comprises bringing the cellulose ester while in a porous, substantially solid, state, into intimate contact with the vapors of a volatile uncombined amino base, and subsequently subjecting the cellulose ester to the action of an organic solvent.

13. In the method of dissolving a cellulose ester, the step which comprises bringing the cellulose ester while in a porous, substantially solid, state, into intimate contact with the vapors of a volatile uncombined amino base, and subsequently subjecting the cellulose ester to the action of an organic solvent, and subsequently eliminating the amino base.

14. In the method of dissolving a cellulose ester, the step which comprises bringing the cellulose ester while in the porous, substantially solid, state, into intimate contact with the vapors of uncombined monomethylamine, and subsequently subjecting the cellulose ester to the action of a relatively small proportion of an organic solvent and stirring the cellulose ester and solvent until the mixture or solution of cellulose ester and solvent acquires the desired consistency and flowing properties.

15. In the method of dissolving a cellulose ester, the step which comprises bringing the cellulose ester while in the porous, substantially solid, state, into intimate contact with the vapors of a volatile uncombined amino base and subsequently subjecting the cellulose ester to the action of a relatively small proportion of an organic solvent and stirring the cellulose ester and solvent until the mixture or solution of cellulose ester and solvent acquires the desired consistency and flowing properties, and subsequently eliminating the volatile amino base.

16. In the method of dissolving a cellulose ester, the step which comprises bringing the cellulose ester while in the porous, substantially solid, state, into intimate contact with the vapors of a volatile uncombined amino base and subsequently subjecting the cellulose ester to the action of a relatively small proportion of an organic solvent and stirring the cellulose ester and solvent until the mixture or solution of cellulose ester and solvent acquires the desired consistency and flowing properties, and subsequently eliminating the volatile amino base by volatilization.

17. In the method of dissolving a cellulose ester, the step which comprises bringing the cellulose ester while in the porous, substantially solid state, into intimate contact with the vapors of a volatile uncombined amino base, and subsequently subjecting the cellulose ester to the action of a relatively small proportion of an organic solvent and stirring the cellulose ester and solvent until the mixture or solution of cellulose ester and solvent acquires the desired consistency and flowing properties, and subsequently neutralizing the monomethylamine with an acid which is soluble in the cellulose ester solution.

18. In the method of dissolving a cellulose ester, the step which comprises bringing the cellulose ester while in the porous, substantially solid state, into intimate contact with the vapors of uncombined monomethylamine, and subsequently subjecting the cellulose ester to the action of a relatively small proportion of an organic solvent and vigorously stirring the cellulose ester and solvent until the mixture or solution of cellulose ester and solvent acquires the desired consistency and flowing properties, and subsequently neutralizing the monomethylamine with an excess of a volatile acid and evaporating the excess of volatile acid.

19. In the method of dissolving a cellulose ester, the step which comprises bringing the cellulose ester into intimate contact with an uncombined aliphatic amine, and subsequently completely separating the aliphatic amine base from the cellulose ester.

20. In the method of dissolving a cellulose ester, the step which comprises bringing the cellulose ester into intimate contact with an uncombined aliphatic amine base, and subsequently neutralizing the aliphatic amine base by means of an acid to form a salt and afterwards removing the salt from the cellulose ester.

In testimony whereof I affix my signature.

ALONZO S. McDANIEL.